United States Patent
Wilson et al.

(10) Patent No.: US 12,326,164 B2
(45) Date of Patent: Jun. 10, 2025

(54) SYSTEMS AND METHODS FOR A HANGER FOR SUPPORTING A THREADED OBJECT

(71) Applicant: ERICO International Corporation, Solon, OH (US)

(72) Inventors: Eric Wilson, Solon, OH (US); Raymond Olle, Valley View, OH (US); Jeff Wilson, Cuyahoga Falls, OH (US)

(73) Assignee: ERICO International Corporation, Solon, OH (US)

( * ) Notice: Subject to any disclaimer, the term of this patent is extended or adjusted under 35 U.S.C. 154(b) by 97 days.

(21) Appl. No.: 18/006,518

(22) PCT Filed: Jul. 23, 2021

(86) PCT No.: PCT/US2021/042989
§ 371 (c)(1),
(2) Date: Jan. 23, 2023

(87) PCT Pub. No.: WO2022/020727
PCT Pub. Date: Jan. 27, 2022

(65) Prior Publication Data
US 2023/0272815 A1   Aug. 31, 2023

Related U.S. Application Data

(60) Provisional application No. 63/056,055, filed on Jul. 24, 2020.

(51) Int. Cl.
F16B 37/00 (2006.01)
F16B 37/02 (2006.01)
F16B 37/08 (2006.01)

(52) U.S. Cl.
CPC ............. *F16B 37/08* (2013.01); *F16B 37/02* (2013.01)

(58) Field of Classification Search
CPC .................................. F16B 37/02; F16B 38/08
USPC ..................................................... 411/431, 970
See application file for complete search history.

(56) References Cited

U.S. PATENT DOCUMENTS

| | | | |
|---|---|---|---|
| 2,066,541 A | | 1/1937 | Schenk |
| 2,160,353 A | * | 5/1939 | Conners ................. H02G 3/065 |
| | | | 285/194 |
| 2,712,917 A | * | 7/1955 | Flora ..................... F16B 5/0685 |
| | | | 248/300 |

(Continued)

FOREIGN PATENT DOCUMENTS

| | | |
|---|---|---|
| CN | 111059126 A | 4/2020 |
| DE | 8707022 U1 | 7/1987 |

(Continued)

*Primary Examiner* — Kristina R Fulton
(74) *Attorney, Agent, or Firm* — Quarles & Brady LLP

(57) ABSTRACT

A hanger (200) is provided for supporting a load on a threaded object (10) with a longitudinal axis. The hanger (200) can include a hanger body (202), a hole (210) in the hanger body (202), and a partial thread portion (212). The hole (210) can be configured to receive the threaded object (10) therethrough. The partial thread portion (212) can be configured to engage with a thread of the threaded object (10) when the hanger (200) is in an engaged configuration. The hanger (200) can be configured to move from a non-engaged configuration to the engaged configuration without rotation of the hanger body (202) or the threaded object (10) about the longitudinal axis of the threaded object (10).

18 Claims, 18 Drawing Sheets

(56) References Cited

U.S. PATENT DOCUMENTS

| | | | |
|---|---|---|---|
| 3,006,231 A * | 10/1961 | Kahn | F16B 5/0291 |
| | | | 470/23 |
| 3,841,196 A | 10/1974 | Tinnerman | |
| 4,473,205 A * | 9/1984 | Rumble | F16L 3/133 |
| | | | 248/62 |
| 5,526,554 A | 6/1996 | Runde et al. | |
| 6,514,027 B1 | 2/2003 | Yiu et al. | |
| 6,631,876 B1 * | 10/2003 | Phillips | F16B 2/22 |
| | | | 248/74.2 |
| 6,632,058 B2 | 10/2003 | Hoffmann et al. | |
| 6,854,944 B2 | 2/2005 | Hoffmann et al. | |
| 6,962,470 B2 | 11/2005 | Anscher | |
| 7,188,392 B2 | 3/2007 | Giugliano et al. | |
| 7,258,519 B2 * | 8/2007 | Shimizu | H02G 3/32 |
| | | | 248/62 |
| 7,735,667 B2 | 6/2010 | Schutz | |
| 8,083,450 B1 | 12/2011 | Smith et al. | |
| 8,261,490 B2 | 9/2012 | Flannery et al. | |
| 8,398,351 B2 | 3/2013 | Hohmann et al. | |
| 8,413,939 B2 | 4/2013 | Ramsauer et al. | |
| 8,561,349 B2 | 10/2013 | Flannery et al. | |
| 9,151,111 B2 | 10/2015 | Flannery et al. | |
| 9,945,176 B2 | 4/2018 | Flannery et al. | |
| 10,018,216 B1 * | 7/2018 | Espinosa | F16B 37/0814 |
| 10,385,906 B2 | 8/2019 | Huang | |
| 10,465,737 B2 | 11/2019 | Huang | |
| 10,570,660 B2 | 2/2020 | Flannery et al. | |
| 2002/0047073 A1 | 4/2002 | Deciry et al. | |
| 2002/0098057 A1 | 7/2002 | Hoffmann et al. | |
| 2003/0175094 A1 | 9/2003 | Hoffmann et al. | |
| 2004/0244145 A1 | 12/2004 | Anscher | |
| 2004/0244149 A1 | 12/2004 | Anscher | |
| 2005/0210631 A1 | 9/2005 | Anscher | |
| 2007/0084024 A1 | 3/2007 | Cheong et al. | |
| 2010/0143066 A1 | 6/2010 | Ramsauer et al. | |
| 2011/0278864 A1 | 11/2011 | Konchan et al. | |
| 2013/0340216 A1 | 12/2013 | Smith et al. | |
| 2016/0375840 A1 | 12/2016 | Dickinson et al. | |
| 2019/0024693 A1 | 1/2019 | Smith et al. | |
| 2020/0025235 A1 | 1/2020 | Smith et al. | |
| 2020/0040932 A1 | 2/2020 | Zhou | |
| 2020/0091643 A1 | 3/2020 | Smith et al. | |
| 2020/0164816 A1 | 5/2020 | Dickinson | |
| 2020/0217344 A1 | 7/2020 | Smith et al. | |

FOREIGN PATENT DOCUMENTS

| | | |
|---|---|---|
| DE | 102018120324 B3 | 1/2019 |
| EP | 1022502 A1 | 7/2000 |
| EP | 3323962 A1 | 5/2018 |
| EP | 2985477 B1 | 7/2019 |
| GB | 2196947 B | 11/1990 |
| GB | 2296060 A | 6/1996 |
| JP | 2017078465 A | 4/2017 |
| KR | 20-0445654 Y1 | 8/2009 |
| KR | 10-2009-0116861 A | 11/2009 |
| KR | 10-1487132 B1 | 1/2015 |
| NL | 7403650 A | 9/1975 |
| WO | 2004/083656 A1 | 9/2004 |

* cited by examiner

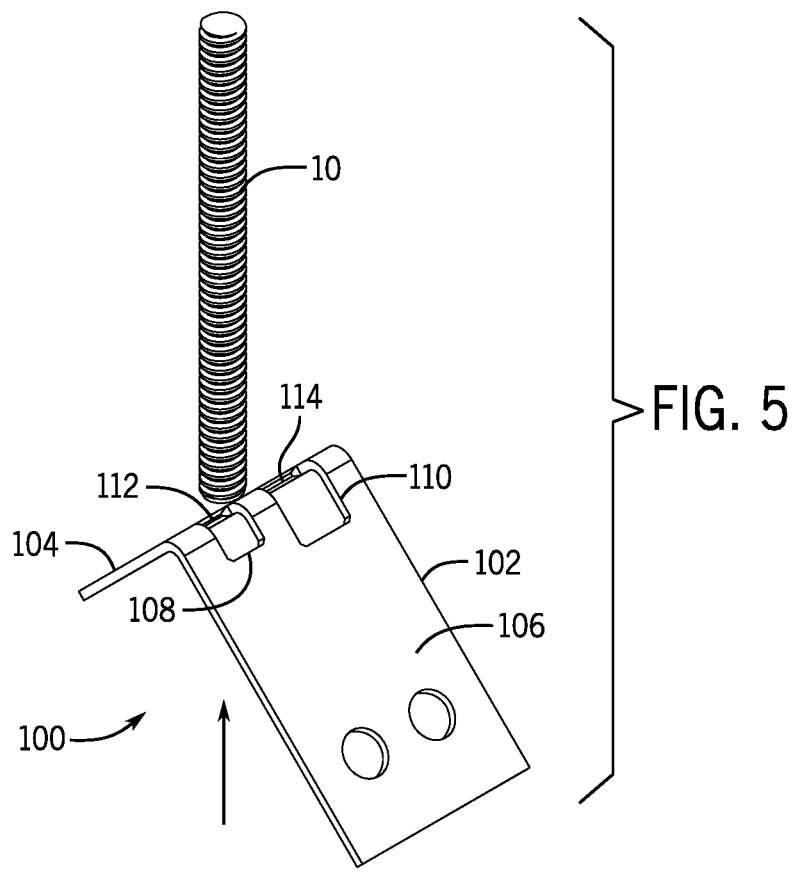
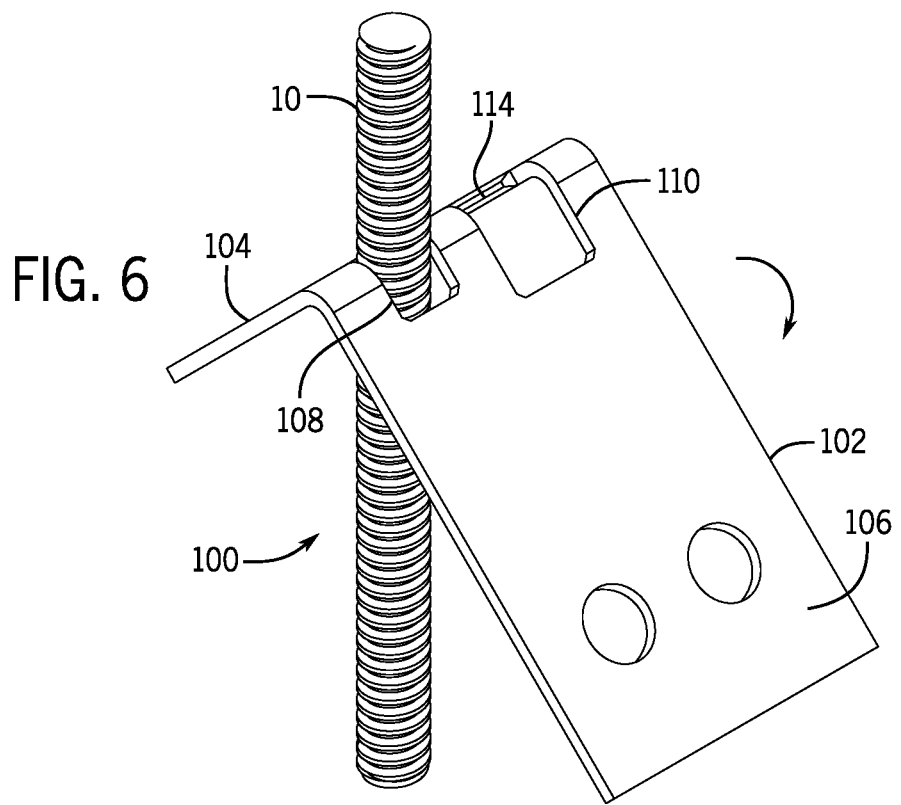

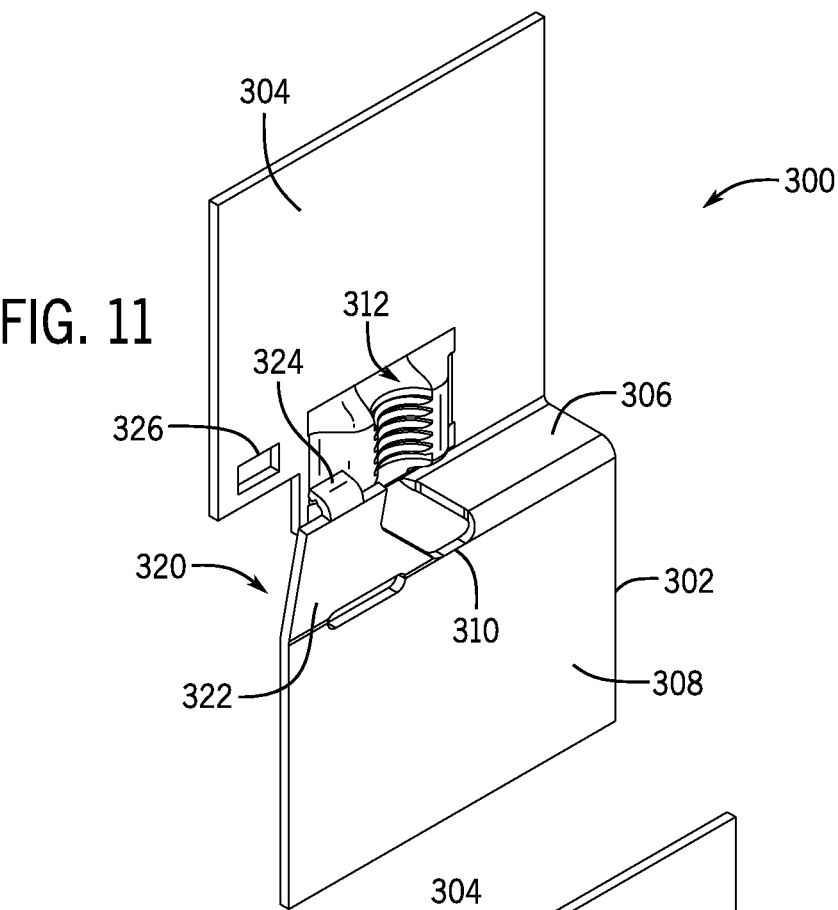
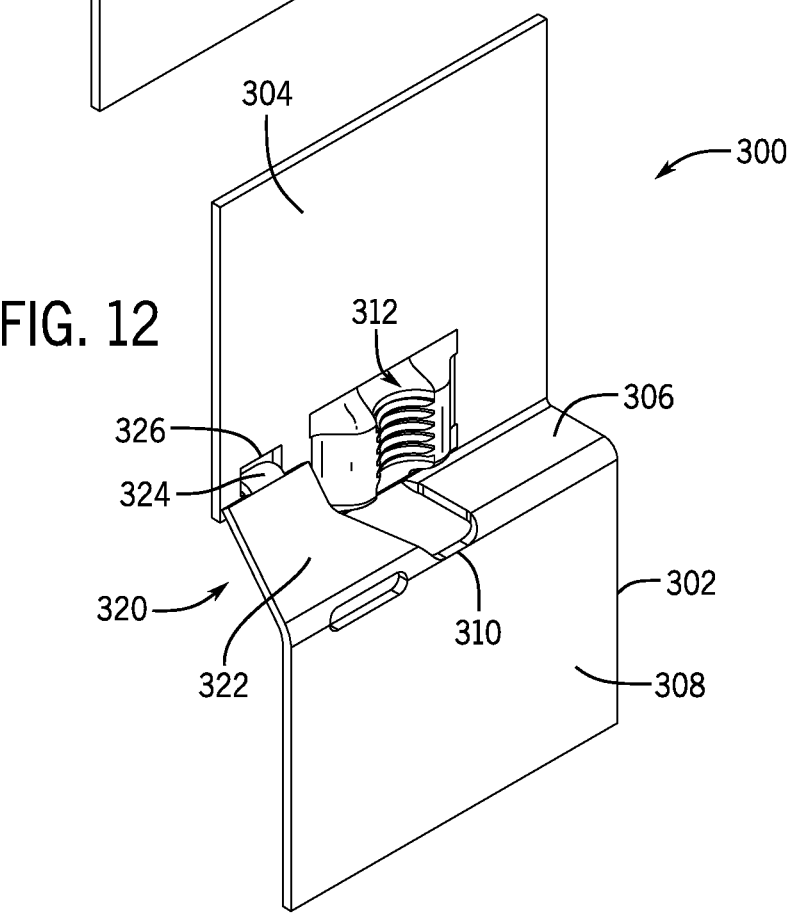

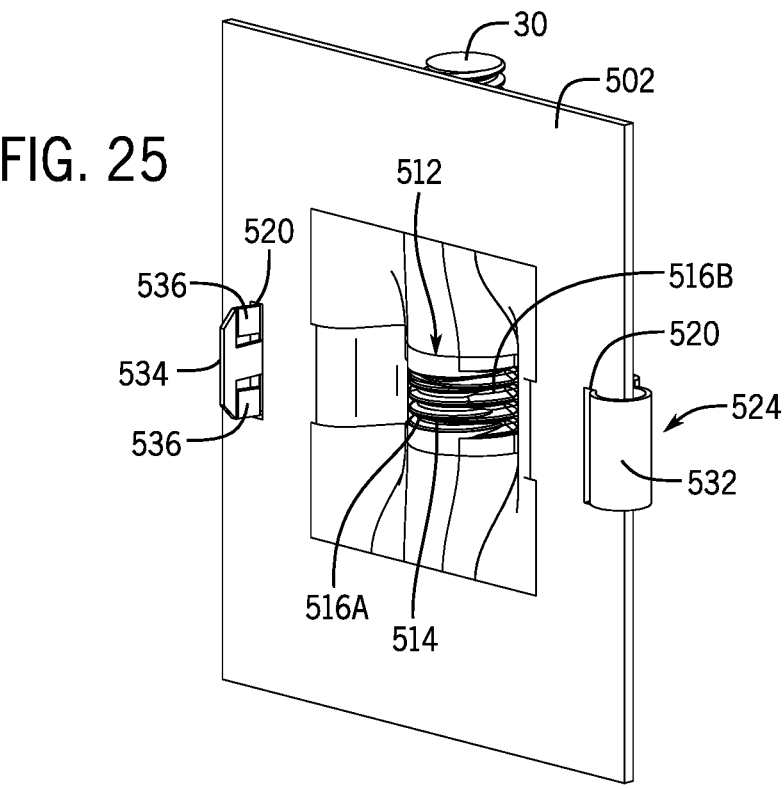
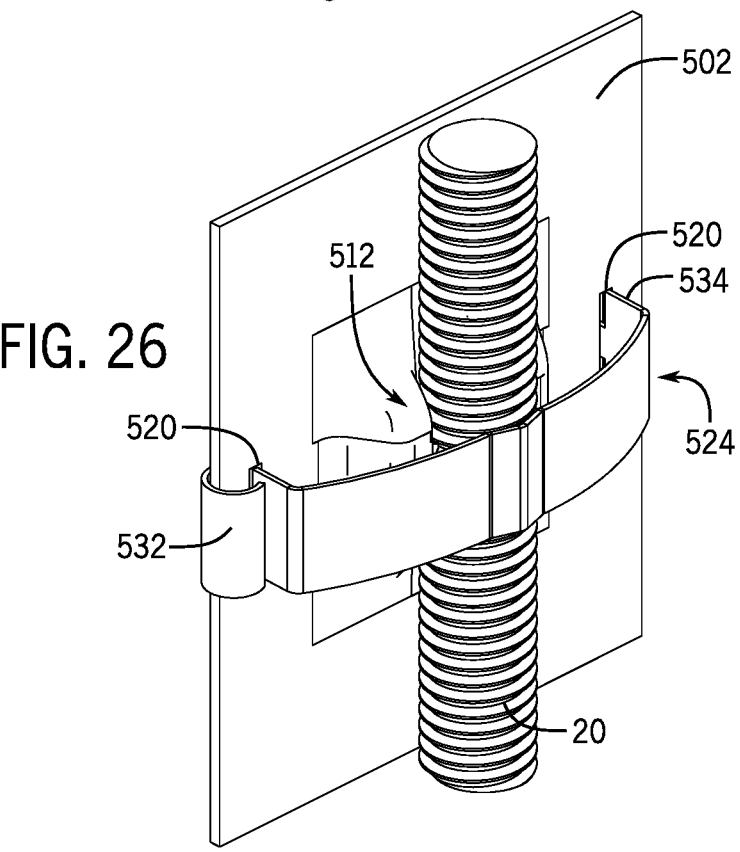

SYSTEMS AND METHODS FOR A HANGER FOR SUPPORTING A THREADED OBJECT

This application is the national stage entry of PCT International Application No. PCT/2021/042989, filed Jul. 23, 2021, which claims the benefit of U.S. Provisional Application No. 63/056,055, filed Jul. 24, 2020, the entireties of which are incorporated herein by reference for all purposes.

BACKGROUND

In many applications it may be useful to support objects relative to threaded objects, such as threaded rods supported from ceilings or other building structures. For example, it may be useful to support raceways, conduit, including electric metallic tube (EMT) conduit, or cable, including metal clad (MC) cable and cable for data transmission, relative to a substrate such as a concrete deck. In some contexts, support of the raceways and cables must be provided at least at or within specified distances along a support structure and within specified distances from a junction box or other termination point as required by code.

SUMMARY

Some embodiments of the invention provide a hanger for supporting a load on a threaded object with a longitudinal axis. The hanger can include a hanger body, a hole in the hanger body, and a partial thread portion. The hole can be configured to receive the threaded object therethrough. The partial thread portion can be configured to engage with a thread of the threaded object when the hanger is in an engaged configuration. The hanger can be configured to move from a non-engaged configuration to the engaged configuration without rotation of the hanger body or the threaded object about the longitudinal axis of the threaded object.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIGS. 5 and 6 illustrate installation steps for engaging the hanger of FIG. 1 with a threaded rod according to an embodiment of the invention;

FIG. 11 is a top front isometric view of a hanger according to another embodiment of the invention, in an open configuration;

FIG. 12 is a top front isometric view of the hanger of FIG. 12 in a closed configuration;

FIG. 25 is a top rear isometric view of the hanger, threaded rod, and retainer of FIG. 24;

FIG. 26 is a top front isometric view of the hanger of FIG. 16 with the retainer of FIG. 23 in an engaged configuration and another threaded rod according to an embodiment of the invention;

DETAILED DESCRIPTION

Figure 1:
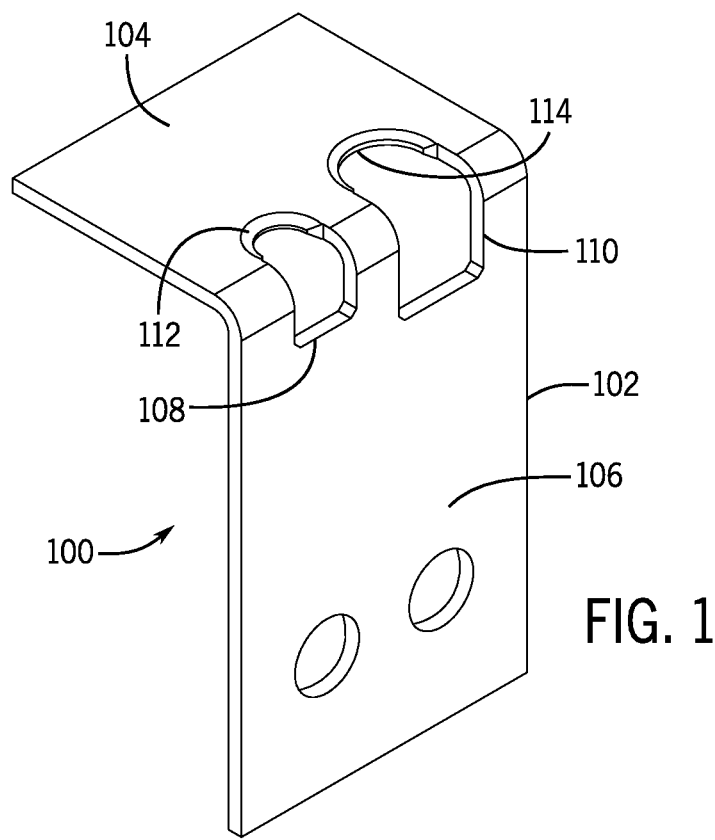
FIG. 1 is a top front isometric view of a hanger according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, directional terms are used for convenience of reference for discussion of particular figures or examples. For example, references to downward (or other) directions may be used to discuss aspects of a particular example or figure, but do not necessarily require similar orientation or geometry in all installations or configurations.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a hanger that engages with a threaded object (e.g., a threaded rod). The context and particulars of this discussion are presented as examples only. For example, embodiments of the disclosed invention can be configured in various ways, including with other shapes and arrangements of elements. Similarly, embodiments of the invention can be used with arrangements of support members or other assemblies other than those expressly illustrated or described herein. In this regard, for example, some embodiments not expressly discussed below can include some or all of the components of any number of the embodiments expressly described and illustrated below, in any variety of combinations. Further, some embodiments can be employed to support objects other than conduit or cables.

In conventional arrangements, a hanger can be attached in various ways to threaded rod to support conduit, cable, or other objects. For example, non-continuous cable supports such as "J-Hooks" can include tabs with holes for receiving a threaded rod therethrough and can be secured to the threaded rod with a nut engaged with the threaded rod. As another example, a J-Hook can have a threaded-rod engaging device riveted, or otherwise attached, to the J-Hook. Examples of threaded rod engaging devices can include a threaded hole or a "bat wing" style clip. Although these conventional arrangements can provide attachment of a hanger to a threaded rod, the hangers can require multiple pieces and installation can require threading the hanger itself to the threaded rod or securing the hanger to the threaded rod by engaging a nut with the threaded rod. Among other issues with conventional designs, the need to rotate a component about a thread axis to provide a secure attachment may complicate installation procedures.

Embodiments of the invention can address these or other issues. For example, a hanger can include (e.g., be integrally formed with) a threaded object engagement mechanism that includes a partial thread. As used herein, "partial thread" indicates a feature in which threads do not extend fully around a relevant circumference. In some embodiments, partially threaded features can include one or more threads that are suitable to engage a threaded rod or other similarly threaded object, but extend over only 180° or less of a relevant circumference. For example, a partial thread may be formed on a hanger to extend only along one half or less of a cylinder that is defined by the radius of the partial thread. As such, some partially threaded features may be configured to engage a threaded object along a circumferential extent that is limited to only one half of a cylinder defined by the threads of the threaded object.

In some embodiments, a hanger can be engaged with a threaded object without threading the hanger or requiring other parts to secure the hanger (i.e., without the need to rotate the threaded object or the hanger about a thread axis of the threaded object and the relevant partial thread). For example, a hanger can be formed to quickly engage a threaded rod through a lever action perpendicular to the thread axis of a threaded rod.

In some embodiments, a partial thread portion may be provided in a hole in which the threaded rod is received or at a location adjacent the hole (e.g., on a protrusion or body feature that extends from or is somewhat removed from the hole). A partial thread may be formed by various methods (e.g., coining, extrusion and tapping, embossing, etc.), may be in one segment, or broken into multiple circumferential segments, and may be located at one or multiple locations axially along a threaded object. In some embodiments, a partial thread may include multiple pitches or may include multiple thread diameters. In some embodiments, a mechanism may be axially spaced from the partial thread to retain a threaded object in a partial thread of a hanger, including as may reduce or prevent radial separation of the partial thread from the threaded object.

Some embodiments of the invention can include a strap configured to engage a threaded object. In some embodiments, a strap can be axially spaced from a partially threaded hole. In some embodiments, a strap can have threads provided thereon (e.g., partial threads) to engage with a threaded object.

FIGS. 1-4 illustrate an example hanger 100 according to an embodiment of the present invention. The hanger 100 includes a hanger body 102. The hanger body 102 is L-shaped and has a set of intersecting legs, a first leg 104 and a second leg 106. Holes 108, 110, are located at the intersection of the first and second legs 104, 106 and each extend into both the first and second legs 104, 106. Each of the holes 108, 110 is configured to separately receive a threaded object, for example, a threaded rod 10 (shown in FIG. 3), therethrough. It is contemplated that a hanger can have only one hole or more than two holes, and other sizes and orientations of holes than are expressly shown may be possible.

The first hole 108 and the second hole 110 each have a partial thread portion 112, 114 provided in the part of the hole 108, 110 that extends onto the first leg 104. As shown, the partial thread portion 112, 114 of the first and second holes 108, 110 have different diameters. The size of the partial thread portions can be based on the size of a threaded object to be engaged therein. For example, the partial thread portion 112 of the first hole 108 can be sized to receive a threaded object having a diameter of ⅜ inch and the partial thread portion 114 of the second hole 110 can be sized to receive a threaded object having a diameter of ½ inch. It should be understood that these sizes are examples and other sizes are contemplated. In some embodiments, the partial thread portions of first and second holes can have the same diameter.

Figure 3:
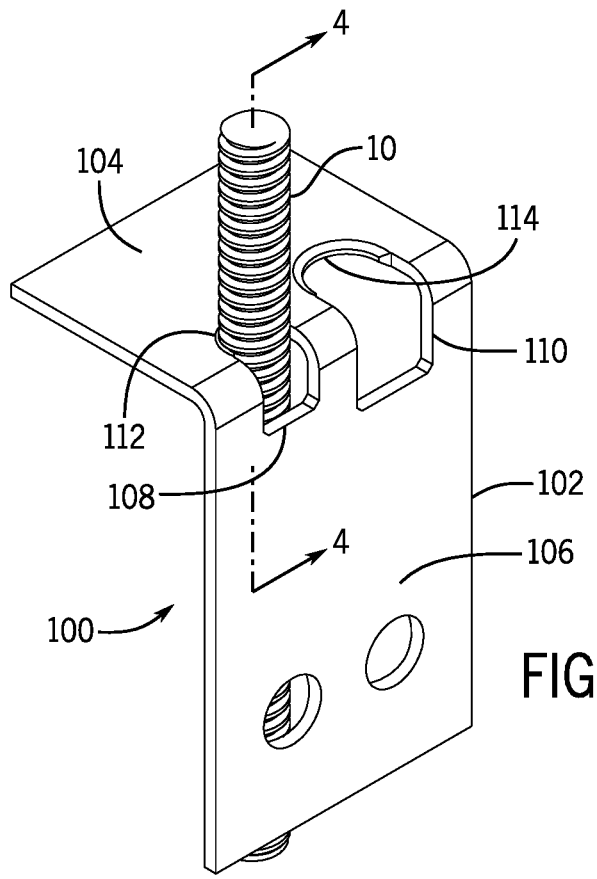
FIG. 3 is a top front isometric view of the hanger of FIG. 1 in an engaged configuration relative to a threaded rod.
Figure 4:
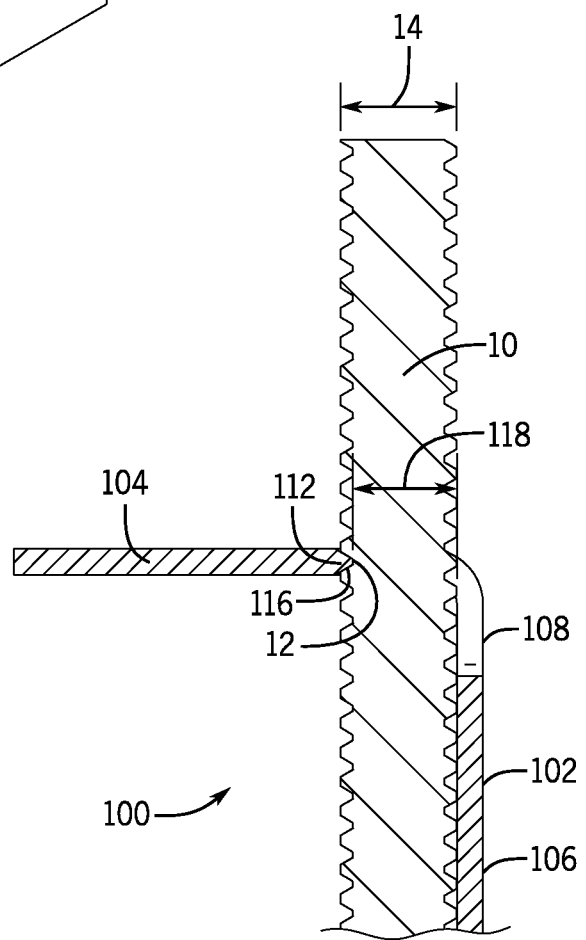
FIG. 4 is a cross-sectional view of the hanger of FIG. 1 with the threaded rod of FIG. 3 along line 4-4 of FIG. 3.

The hanger 100 is configured to move between a non-engaged configuration (e.g., as shown in FIG. 6) and an engaged configuration (shown in FIG. 3). Looking at the first hole 108 in FIGS. 3 and 4, the partial thread portion 114 can engage a portion of the circumference of the thread 12 of the threaded rod 10 to carry an axial load when the hanger 100 is in the engaged configuration. A distance 118 from a crest 116 of the partial thread portion 112 to the second leg 106 is less than the outer diameter 14 of the threaded rod 10. Having the partially threaded portion 112 opposite the second leg 106, and sizing the distance 118 as provided, can increase the engagement of the hanger 100 and the threaded rod 10 as more load is applied to the second leg 106. The second leg 106 acts as a retainer, maintaining the engagement of the partial thread portion 112 with the threaded rod 10.

Looking at FIGS. 5 and 6, the process of installing the hanger 100 on the threaded rod 10 is shown. As shown in FIG. 5 in particular, the hanger 100 is oriented to receive the threaded rod 10 through the first hole 108. The hanger 100 can be then moved in the direction of the arrow as shown in FIG. 5 to receive the threaded rod 10 in the first hole 108. Once the rod is received through the first hole 108 (e.g., as shown in FIG. 6), the partial thread portion 112 of the first hole 108 is positioned to engage the thread 12. The hanger 100 is then pivoted about the partial thread portion 112 in the direction of the arrow as shown in FIG. 6, in some cases, until the second leg 106 contacts the threaded rod 10 (shown in FIG. 3). The L-shape of the hanger 100 is such that the second leg 106 acts as a lever to move the partial thread portion 112 into engagement with the thread 12. The contact of the hanger 100 with both sides of the threaded rod 10 can then help to retain the threaded rod 10 in the engaged configuration, although the partial thread portion 112 extends around only half (or less) of the circumference of the threaded rod 10. Further, due to the position of the engagement of the thread 12 with the partial thread portion 112 and the relative offset thereto of a load applied to the second leg 106, any increasing in the load may tend to further increase the engagement, even despite an axial load tending to urge the thread 12 and partial thread portion 112 apart due to the angle of the threads.

In different embodiments, a partial thread can be formed in different ways. In some cases, a partial thread portion can be formed by coining. In some cases, coining can be performed by compressing an inner circumference of a partial thread tool into a chamfered edge of a hole. As another example, a partial thread can be formed by tapping. An example, the partial thread portions 112, 114 can also be formed by tapping a thread into the first and second holes 108, 110.

Figure 2:
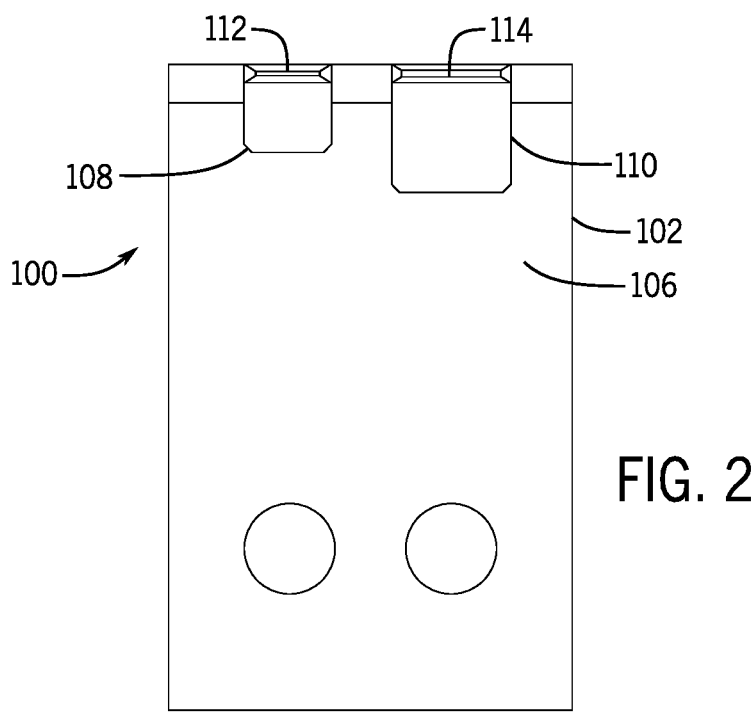
FIG. 2 is a front elevation view of the hanger of FIG. 1.
Figure 31:
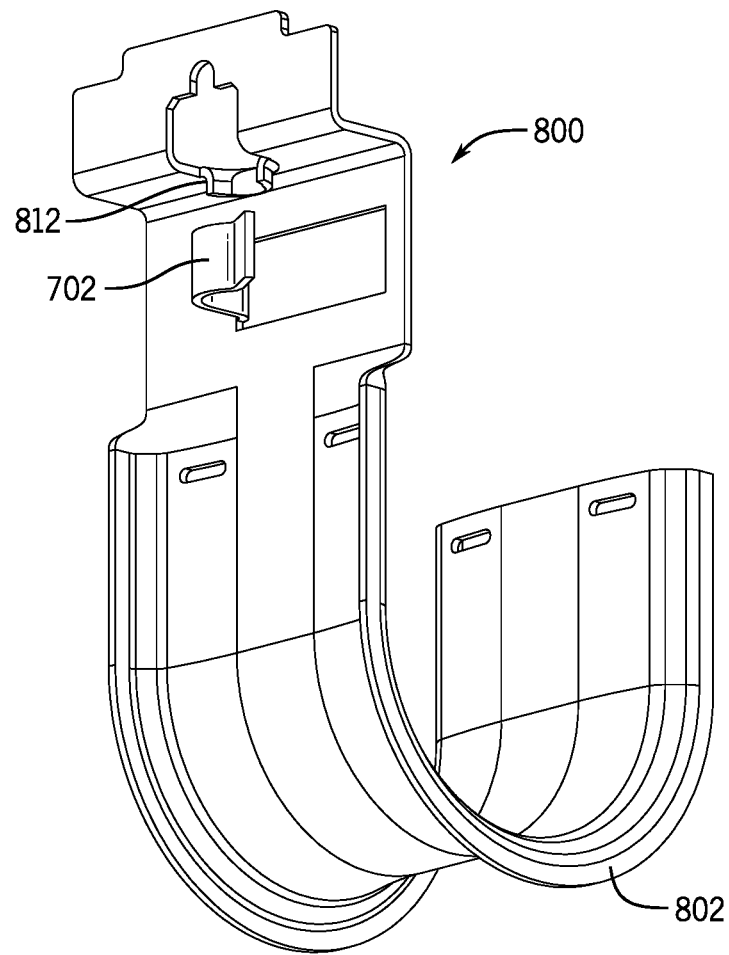
FIG. 31 is a bottom rear isometric view of a J-Hook incorporating a hanger with a strap according to another embodiment of the invention.

In some embodiments, a partial thread may include a single thread (i.e., may have a single crest) or may include multiple threads (i.e., may have multiple crests). As shown in FIGS. 1 and 2, for example, the partial thread portions 112, 114 are each a single thread. If desired, more threads can be formed, including through a process of extruding a hanger at a relevant hole to provide a side wall at the hole with a depth greater than the thickness of the hanger body. The hole, including the extruded feature can then be tapped, and a portion of the extruded feature removed to provide a partial thread portion. An example of an extruded partially threaded feature can be seen in FIG. 31, as an extruded partial thread portion 812.

As shown in FIGS. 1-6, the first leg 104 and the second leg 106 are different sizes, with the second leg 106 larger than the first leg 104. It should be understood that the size of the first and second legs 104, 106 can be modified, wherein a first leg is larger than a second leg and wherein the legs are of the same size.

FIGS. 7-10 illustrate another hanger 200 according to an embodiment the invention. The hanger 200 includes a hanger body 202. The hanger body 202 is Z-shaped and has an upper leg 204, an intermediate portion 206, and a lower leg 208. A hole 210 is located in and extends across the intermediate portion 206. The hole 210 is configured to receive the threaded rod 10 (shown in FIGS. 9 and 10) therethrough. Although the hanger 200 is shown with only one hole, it is contemplated that the hanger 200 can have more than one hole. Further, some embodiments may include a hole that extends only partially across an intermediate portion of a Z-shaped body, or a hole that is otherwise arranged.

Figure 7:
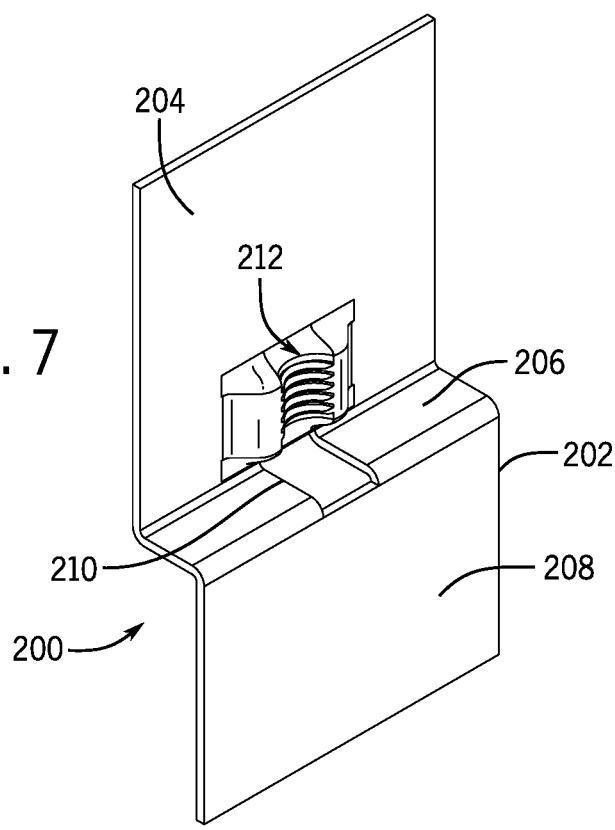
FIG. 7 is a top front isometric view of a hanger according to another embodiment of the invention.
Figure 8:
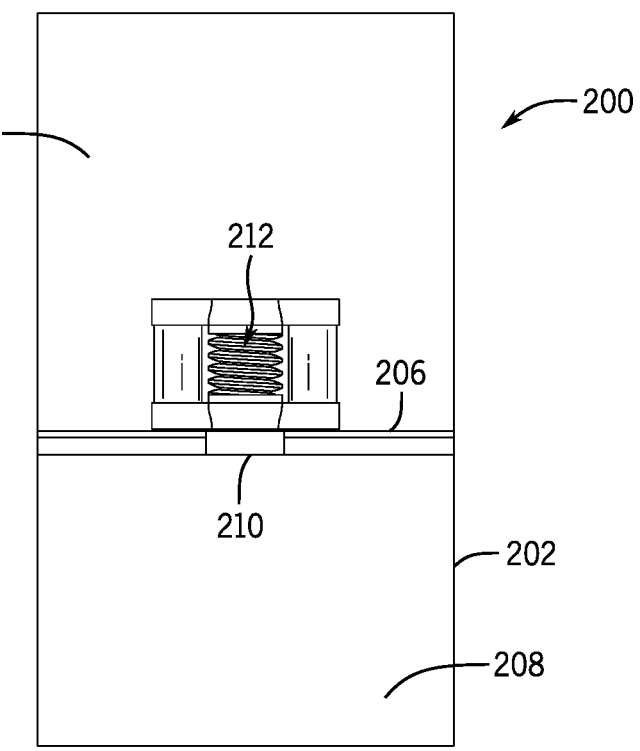
FIG. 8 is a front elevation view of the hanger of FIG. 7.
Figure 9:
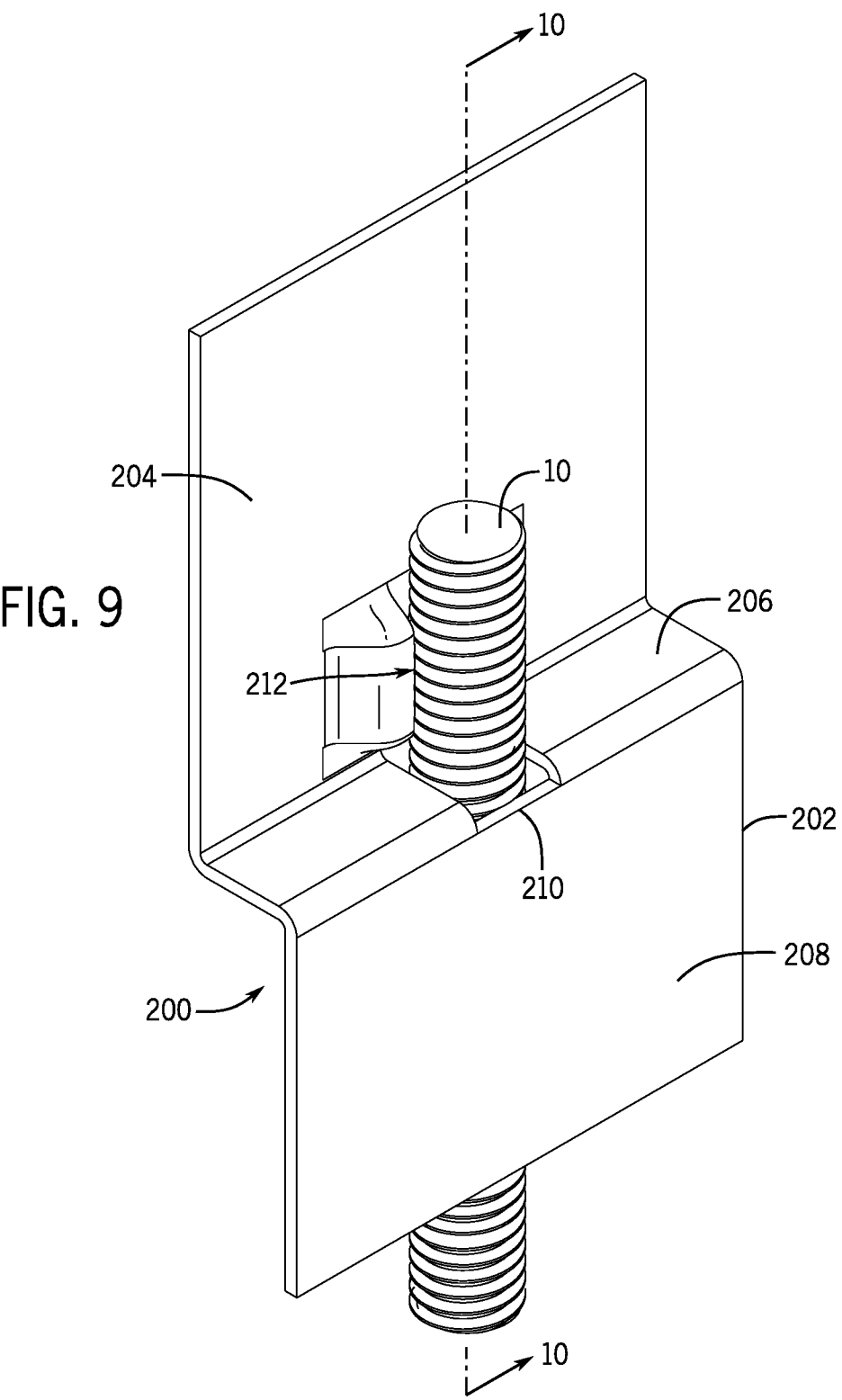
FIG. 9 is a top front isometric view of the hanger of FIG. 7 with a threaded rod in an engaged configuration.

Looking at FIGS. 7 and 8 in particular, a partial thread portion 212 is shown in the upper leg 204. The partial thread portion 212 extends from the upper leg 204 in the direction of the hole 210 and the lower leg 208 and has a plurality of threads 216 (see also FIG. 10). The partial thread portion 212 can be formed through coining, similar to the partial thread portions 112, 114 described above with respect to hanger 100 or through a variety of other processes. The partial thread portion 212 is configured to engage with threads 12 of the threaded rod 10, generally similarly to the partial thread portions 112, 114 as discussed above. Additionally, or alternatively, a partial thread portion (not shown) can be provided on the lower leg 208 extending in the direction of the hole 210 and the upper leg 204.

Figure 10:
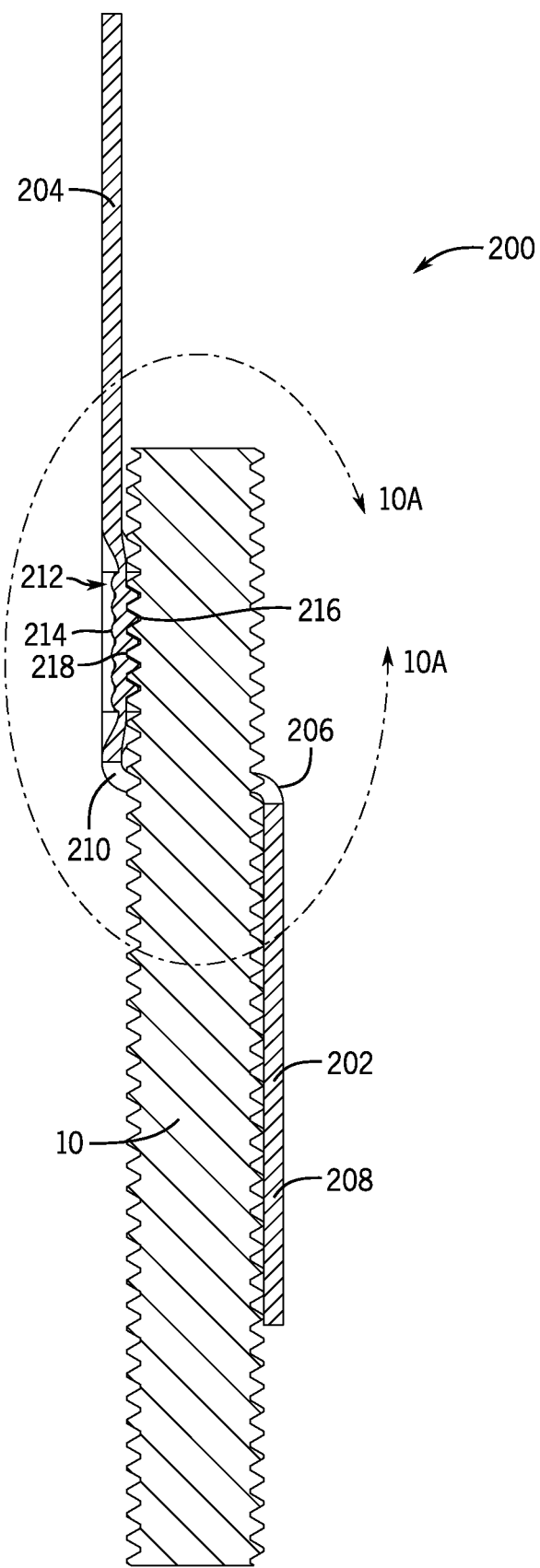
FIG. 10 is a cross-sectional view of the hanger with the threaded rod of FIG. 9 along line 10-10 of FIG. 9.
Figure 10A:
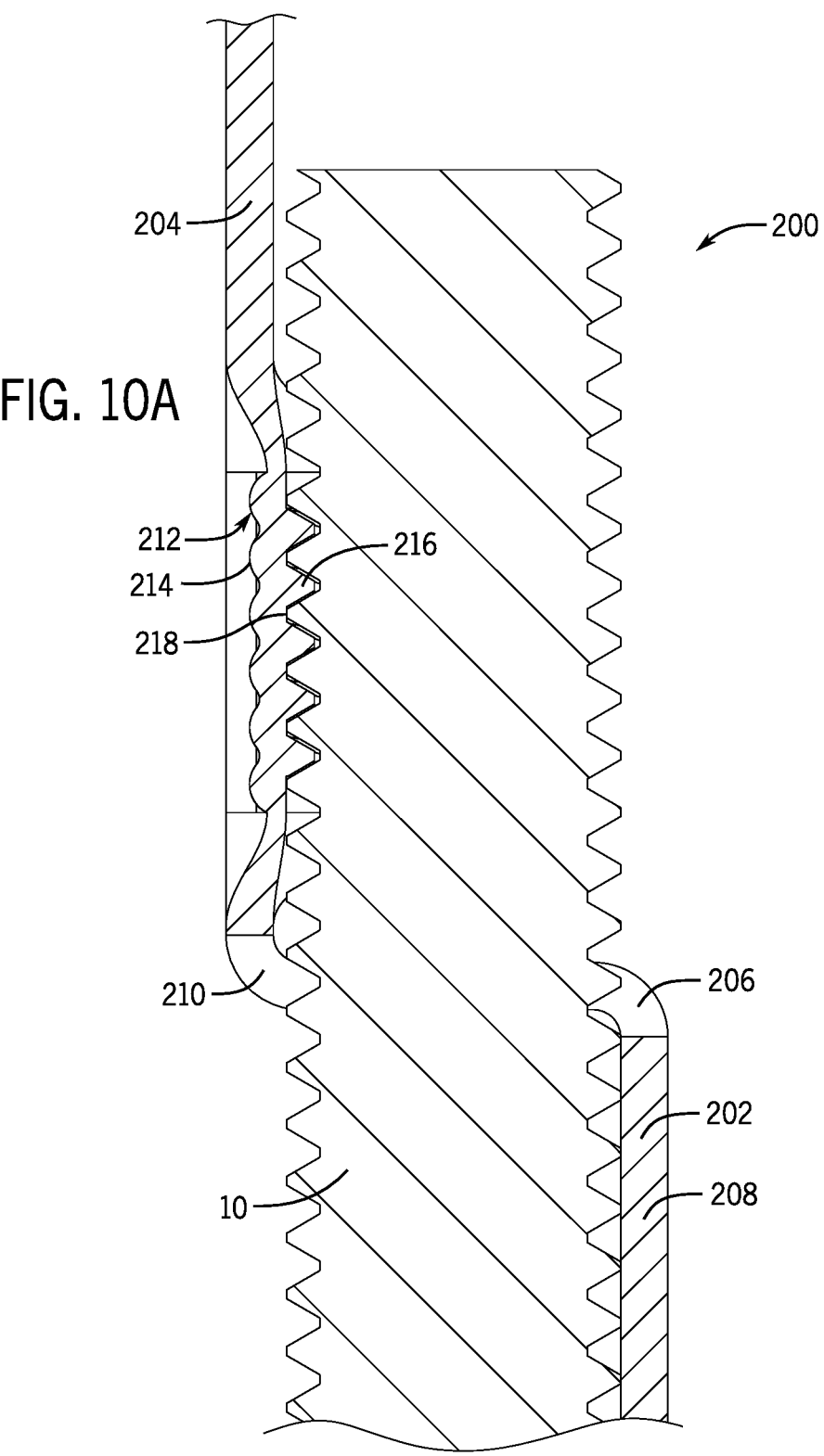
FIG. 10A is an enlarged view of the cross-sectional view of the hanger of FIG. 7 with the threaded rod of FIG. 10.

A cross-section of the hanger 200 engaged with the threaded rod 10 is shown in FIG. 10 and an enlarged view of the partial thread portion 212 of FIG. 10 is shown in FIG. 10A. In particular, it can be seen that the partial thread portion 212 has been formed to have ribs 214 opposite the roots 218 of the partial thread portion 212. In some embodiments, such an arrangement can result in a more efficient and effective manufacturing process. In some embodiments, this arrangement can make more efficient use of the material used to form the partial thread 212.

As can be seen in FIG. 10, the hanger 200 engages with the threaded rod 10 in a similar manner as the hanger 100. In particular, the threaded rod 10 is received through the hole 210. When the partial thread portion 212 of the hanger 200 is aligned with a portion of the thread 12 of the threaded rod 10, the thread 12 can then be then engaged with the partial thread portion 212 (e.g., by translation or pivoting of the hanger 200). The hanger 200 can then be pivoted relative to the threaded object 10 to move the upper and lower legs 204, 208 toward the threaded rod 10 (e.g., until the lower leg 208 contacts the threaded rod 10). The lower leg 208 acts as a retainer, maintaining the engagement of the partial thread portion 212 with the threaded rod 10 when rotated to an engaged configuration.

FIGS. 11 and 12 illustrate another embodiment of a hanger 300 according to the invention, as also can be engaged with a threaded object (not shown). In many aspects, the hanger 300 is similar to the hanger 200 described above and similar numbering in the 300 series is used for the hanger 300. For example, the hanger 300 has a hanger body 302 that is Z-shaped, and has an upper leg 304, an intermediate portion 306, and a lower leg 308. Further, a hole 310 is located in the intermediate portion 306. The hanger 300 is also shown with a partial thread portion 312 in the upper leg 304.

In some aspects, however, the hangers 200, 300 differ from each other. For example, the hanger 300 further includes a side entry 320. The side entry 320 has a closure 322 extending from and bendable relative to the lower leg 308. The intermediate portion 306 does not extend along the location of the closure 322 (or, alternatively, the closure 322 can be viewed as forming a substantial part of the intermediate portion 306), which allows lateral access to the hole 310 when the hanger 300 is in an open configuration as shown in FIG. 11. The side entry 320 allows placement of the hanger 300 anywhere along a threaded object, without the need to "stab" the threaded object into the hole 310. For example, if no end of the threaded rod 10 is accessible, the side entry 320 allows a threaded object (for example, the threaded rod 10 shown in FIG. 9) to be received through the side entry 320.

In some embodiments, the closure 322 can be configured to be secured in an open or closed configuration in a variety of ways. For example, have a closure tab 324 extending from a distal end of the closure 322. The closure tab 324 is receivable with a hole 326 within the upper leg 304. When in a closed configuration as shown in FIG. 12, the closure 322 is bent relative to the lower hanger body 302, towards the upper leg 304, and the closure tab 324 is received within the hole 326. In the closed configuration, with a threaded object engaged therein, the hanger 300 is capable of carrying a load and the closure 322 acts as a retainer (as does the leg 308), maintaining the engagement of the partial thread portion 312 and the lower leg 308 with the threaded rod 10 and prevents the threaded object from laterally exiting the hole 310. It should be noted that other configurations of a side entry are contemplated. For example, a closure can be positioned on the other side of the hole 310, a closure can extend from the upper leg 304 with a closure tab or other latching mechanism to be engaged with the lower leg 308, or some combination of these.

Figure 13:
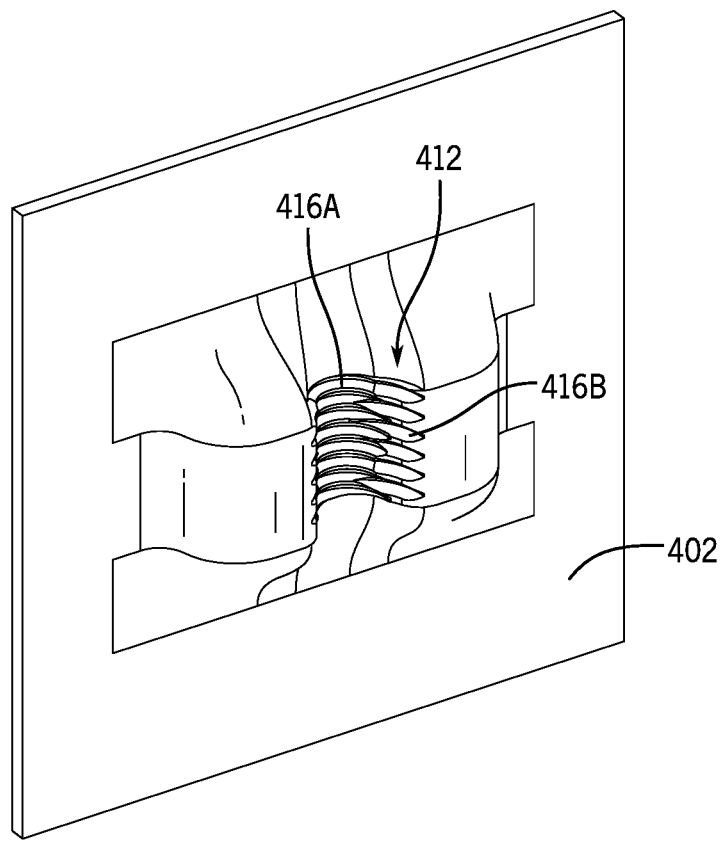
FIG. 13 is a top front isometric view of a hanger according to another embodiment of the invention.
Figure 14:
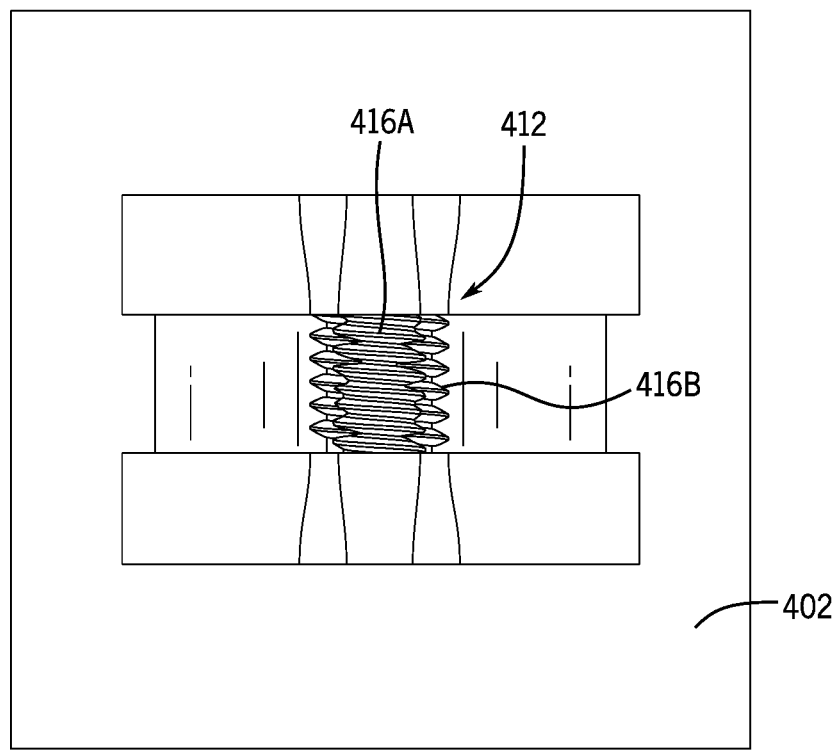
FIG. 14 is a front elevation view of the hanger of FIG. 13.
Figure 15:
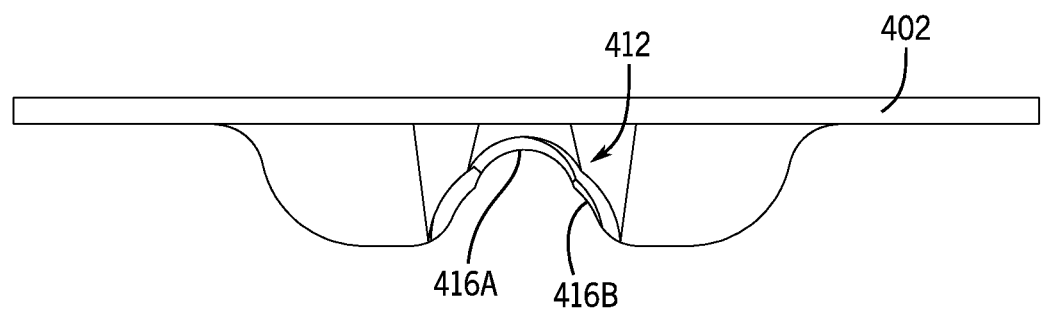
FIG. 15 is a top plan view of the hanger FIG. 13.

Looking now to FIGS. 13-15, a partial thread portion can also be formed with multiple sized threads according to another embodiment of the invention. For example, a partial thread portion 412 on a hanger body 402 of a hanger, for example the hanger 300, is shown with a set of nested threads, including a first thread 416A nested within a second thread 416B. The first thread 416A is smaller than the second thread 416B (i.e., is configured to engage threads of a threaded object with a smaller diameter than is the thread 416B). By superimposing a smaller thread into a larger thread, multiple diameters of threaded objects can be engaged by the same partially threaded feature. For example, the first thread 416A can sized to engage a ¼ inch diameter threaded object (not shown) and the second thread 416B can be sized to receive a ⅜ inch diameter threaded object (not shown). Thus, for example, the partial thread portion 412 can be used to secure a hanger to threaded rods with diameters of either ¼ inch or ⅜ inch. It is contemplated that other embodiments can have different thread sizes. In some embodiments, the first thread 416A can be sized to engage a ⅜ inch diameter threaded object (not shown) and the second thread 416B can be sized to receive a ½ inch diameter threaded object (not shown).

FIGS. 16 through 26 illustrate another embodiment of a hanger 500 according to the invention, as also can be used with nested threads of different sizes in a partial thread portion 512 on a hanger body 502. In many aspects, the hanger body 502 is similar to the hanger body 402 described above and similar numbering in the 500 series is used for the hanger 500. For example, the hanger body 502 has a partial thread portion 512 with a set of nested threads, including a first thread 516A nested within a second thread 516B. The first thread 512A is smaller than the second thread 516B.

Figure 16:
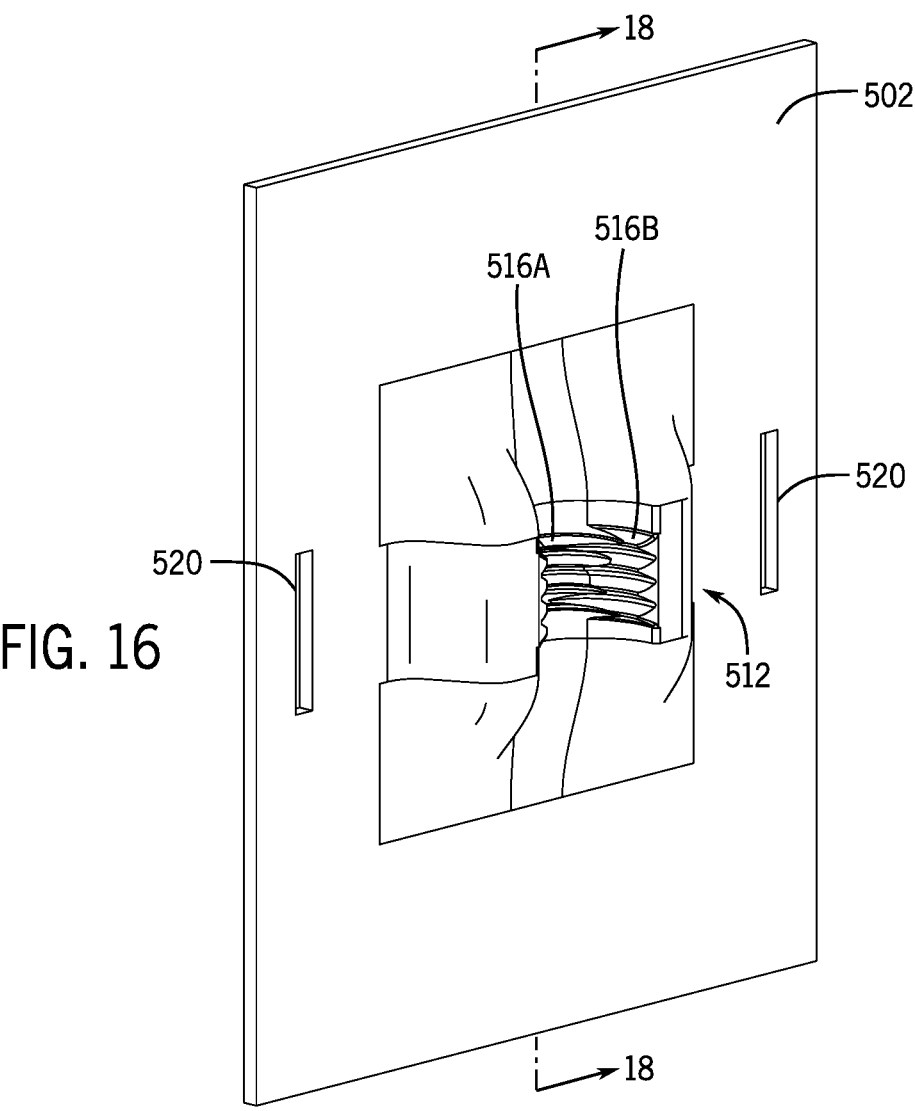
FIG. 16 is a top front isometric view of a hanger according to another embodiment of the invention.
Figure 17:
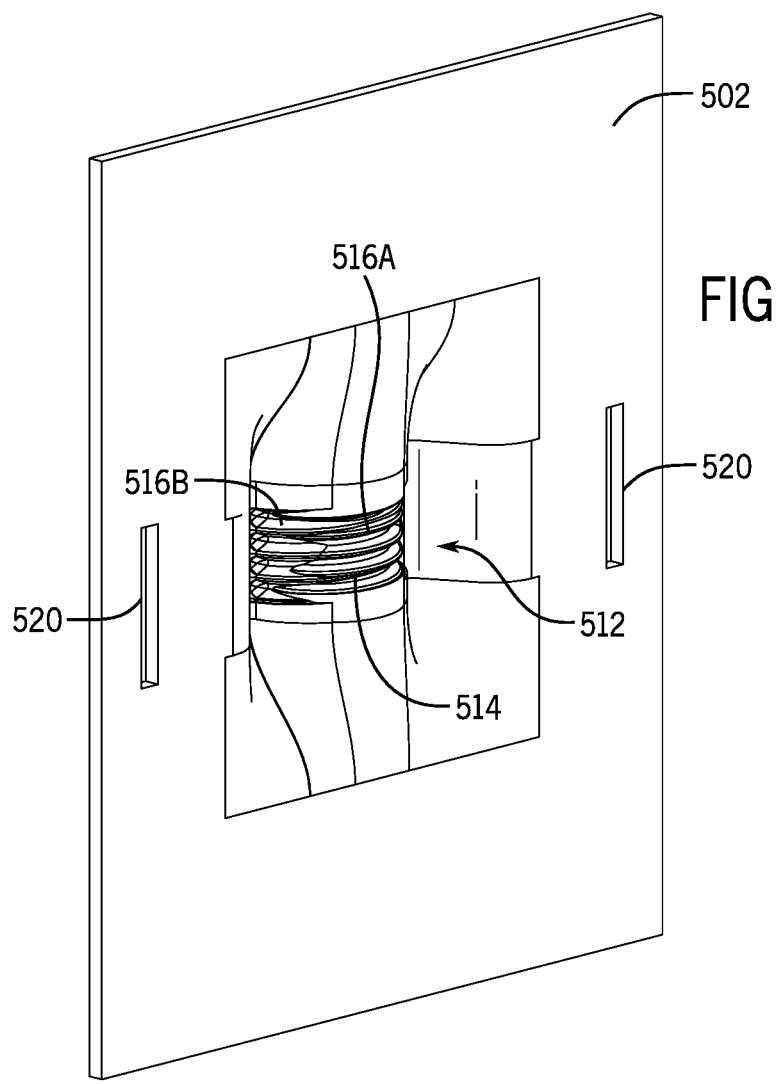
FIG. 17 is a top rear isometric view of the hanger of FIG. 16.
Figure 18:
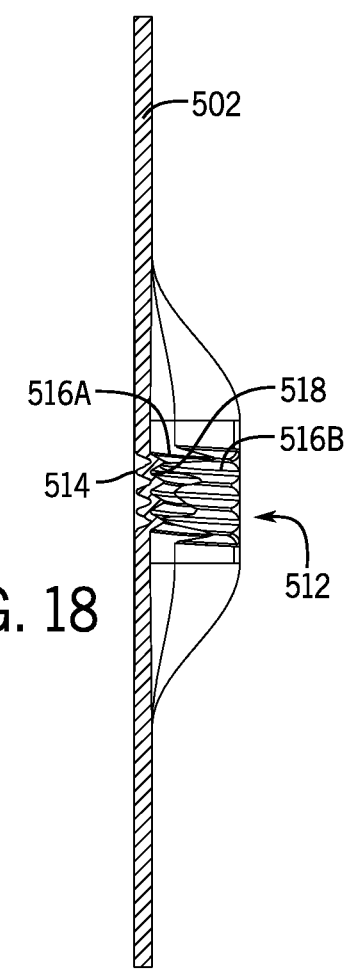
FIG. 18 is a cross-sectional view of the hanger of FIG. 16 along line 18-18 of FIG. 16.

Further, as can be seen in FIGS. 16 and 17, in some embodiments, the backside of the partial thread portion 512 is corrugated. For example, the partial thread portion 512 has ribs 514 opposite roots 518 of the first and second threads 516A, 516B. This is also similar to the partial thread portion 212 described above with respect to the hanger 200.

In some aspects, however, the hanger bodies 402, 502 differ from each other. For example, the hanger body 502 includes a set of slots 520 configured to be part of a threaded object retention assembly, which can include the set of slots 520 and a retainer (e.g., a clip retainer strap 522 as shown in FIGS. 17 through 20 or a hinged retainer strap 524 as shown in FIGS. 23 through 26). The clip retainer strap 522 has a set of clip ends 526, each with catch 528 and a tab 530 extending outward and disposed at an angle greater than zero degrees from the respective clip end 526. In some embodiments, the clip retainer strap 522 can be formed from spring steel.

Figure 19:
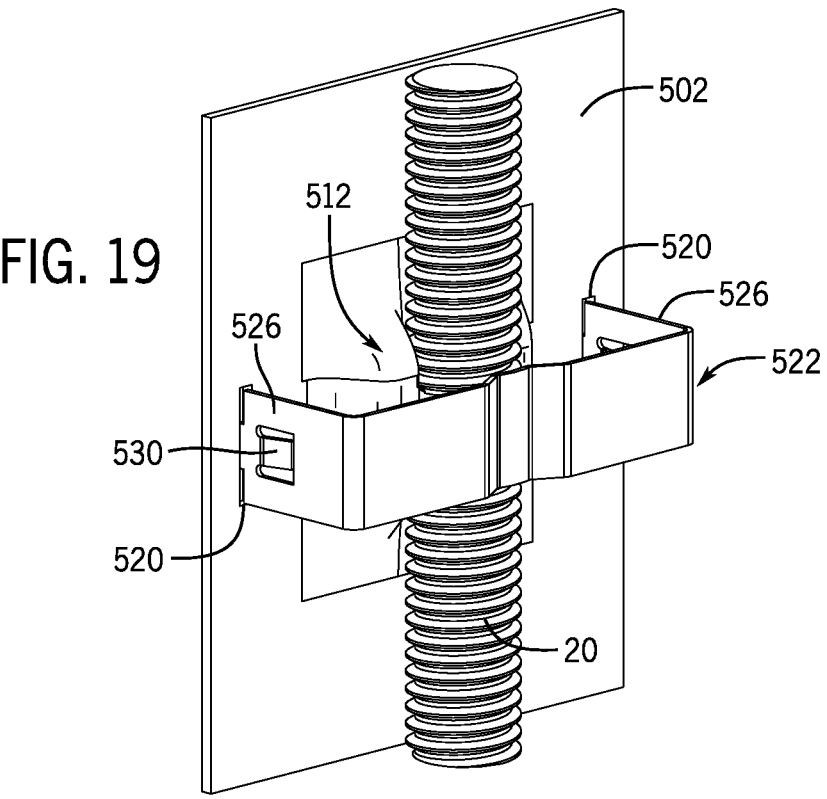
FIG. 19 is a top front isometric view of the hanger of FIG. 16 with a threaded rod and a retainer in a non-engaged configuration according to another embodiment of the invention.
Figure 20:
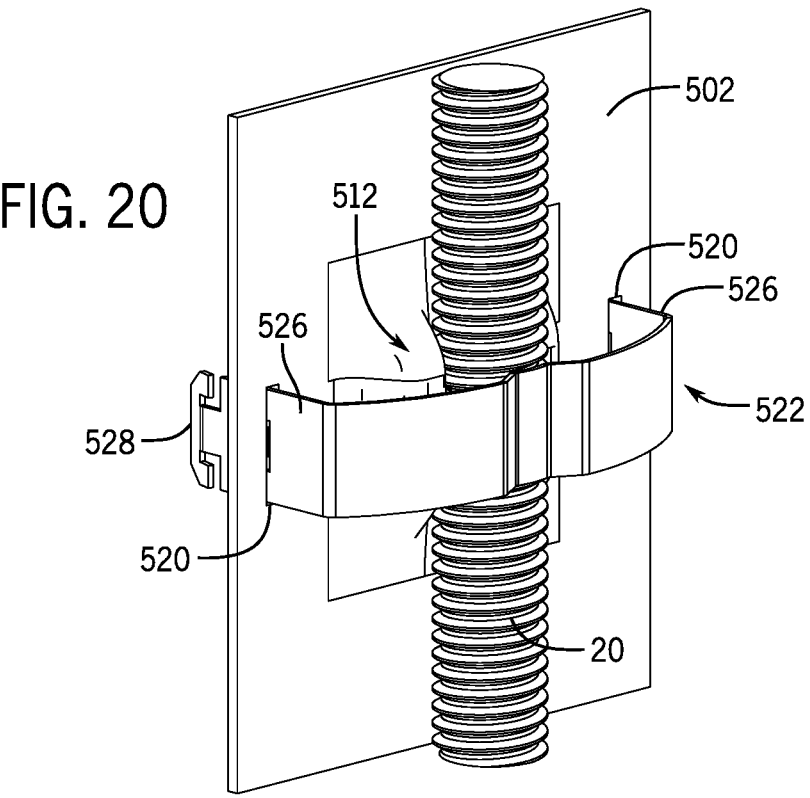
FIG. 20 is a top front isometric view of the hanger, threaded rod, and retainer of FIG. 19 with the retainer in an engaged configuration.
Figure 21:
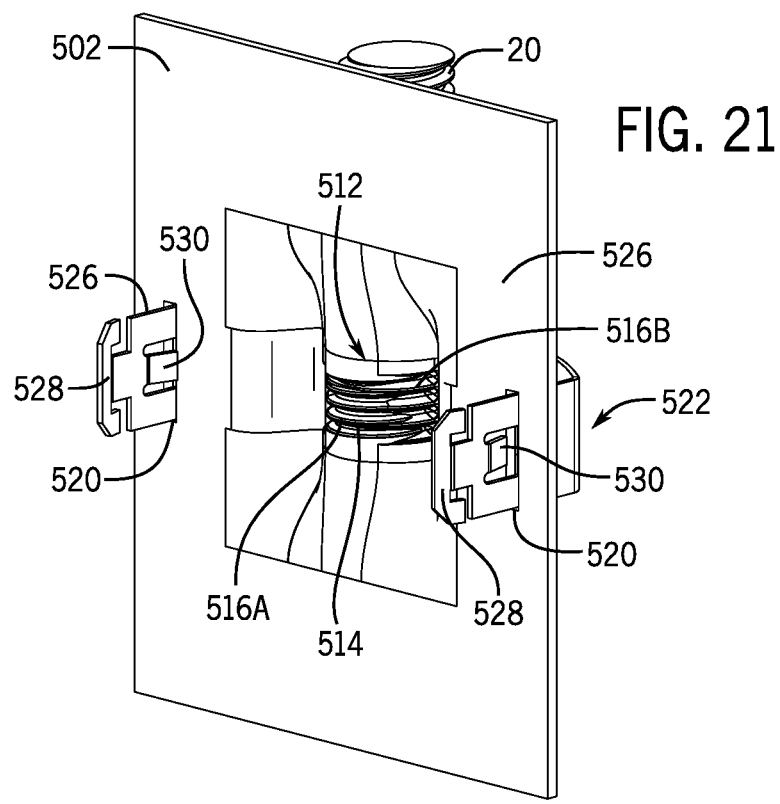
FIG. 21 is a top rear isometric view of the hanger, threaded rod, and retainer of FIG. 20.
Figure 22:
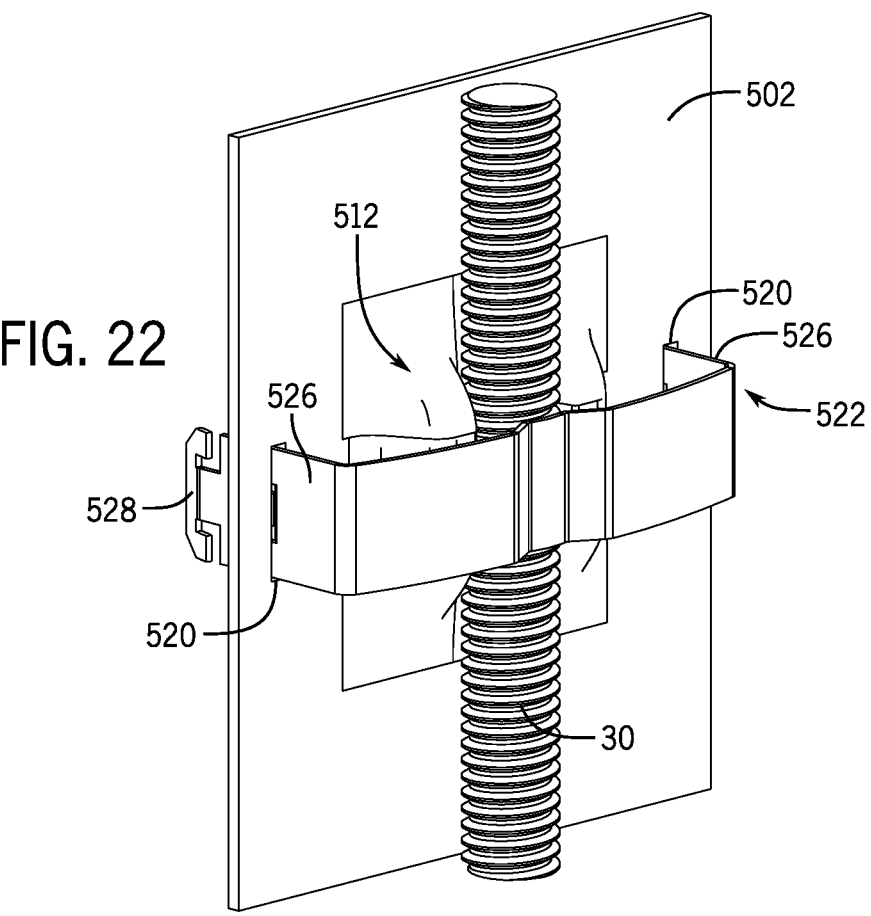
FIG. 22 is a top front isometric view of the hanger of FIG. 16 with the retainer of FIG. 19 in an engaged configuration and another threaded rod according to embodiment of the invention.
Figure 23:
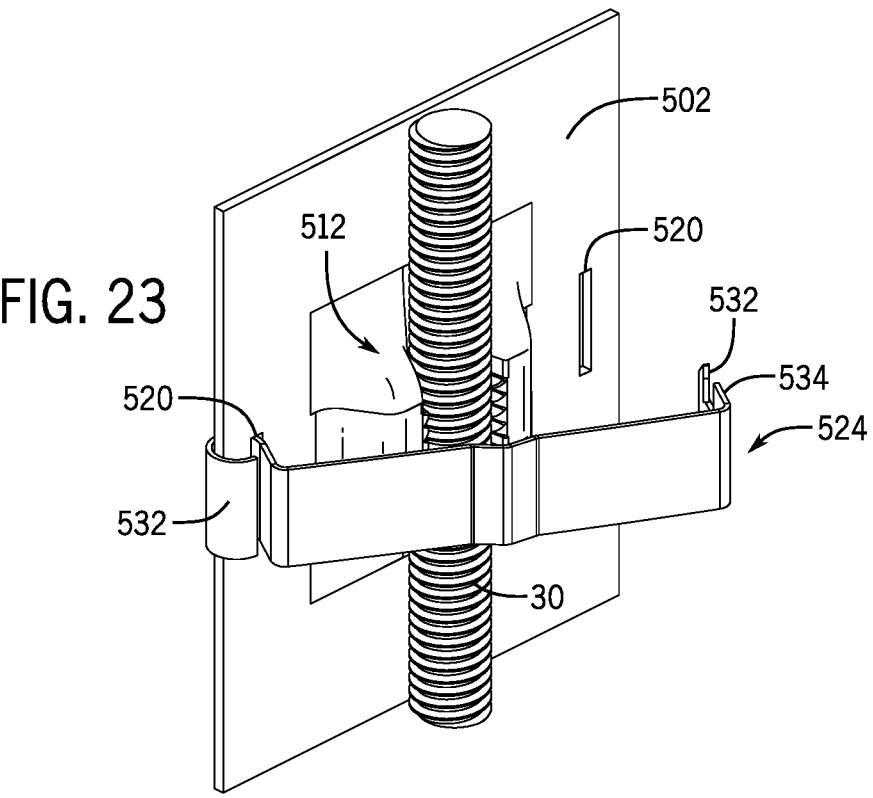
FIG. 23 is a top front isometric view of the hanger of FIG. 16 with a threaded rod and a retainer in a non-engaged configuration according to another embodiment of the invention.
Figure 24:
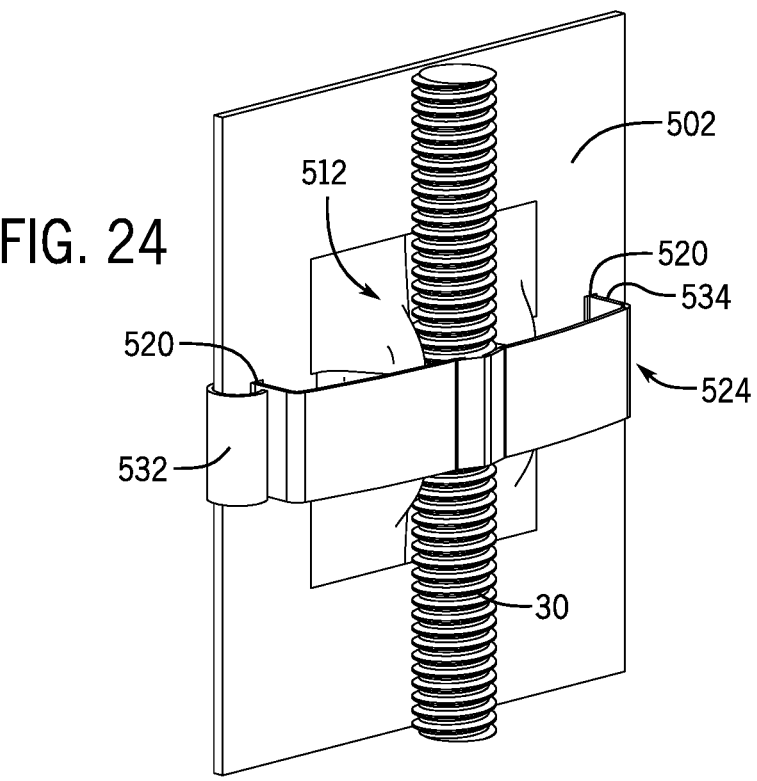
FIG. 24 is a top front isometric view of the hanger of FIG. 23 with the retainer in an engaged configuration.

The catches 528 are configured to be received within the set of slots 520. The catches 528 can be configured to be bent to prevent the removal of the clip ends 526 from the set of slots 520 and relatively loosely couple the clip retainer strap 522 to the hanger body 502 in a receiving position (shown in FIG. 19). A threaded object (e.g., a ½ inch threaded rod 20 as shown in FIGS. 19 through 21) can be received between the partial thread portion 512 and the clip retainer strap 522. From the receiving position, the clip retainer strap 522 is configured to move from a non-engaged configuration (shown in FIG. 19) in which the catches 528 of the clip ends 526 are passed through the set of slots 520 and an engaged configuration (shown in FIGS. 20 and 21) in which the clip ends 526 are urged further within the set of slots 520 until the tabs 530 pass through the set of slots 520. In the illustrated embodiment, the tabs 530 are resilient and configured to bend (e.g., resiliently flex) relative to the clip end 526 to pass through the set of slots 520 and spring back to contact the back of the hanger body 502 as shown in FIG. 21 to induce a retention force onto the threaded rod 20 to retain thread engagement between threads of the threaded rod 20 that are engaged with the partial thread portion 512. However, a strap or other retainer in other embodiments can otherwise engage a hanger body according to various known mechanical engagement types (e.g., keyhole openings, bayonet engagements, etc.). FIG. 22 further illustrates a ⅜ inch threaded rod 30 retained between the partial thread portion 512 and the clip retainer strap 522.

The hinged retainer strap 524 shown in FIGS. 23 through 26 is similar to the clip retainer strap 522. However, the hinged retainer strap 524 has a hinge end 532 and a clip end 534. The hinge end 532 can be formed as a curved section of the hinged retainer strap 524 that extends through one of the set of slots 520 and is hingedly retained therein by the curvature of the curved section. The hinged retainer strap 524 can then rotate relative to the hanger body 502 via the hinge end 532. The clip end 534 can include a set of tabs 536 to pass through the other slot of the set of slots 520 and engage with the back side of the hanger body 502.

The clip retainer strap 522 and the hinged retainer strap 524 are provided as examples of retention devices. Other configurations of retention devices are contemplated, including, for example, both retention devices integrally formed with the hanger body 502 and independently formed from the hanger body 502.

Figure 27:
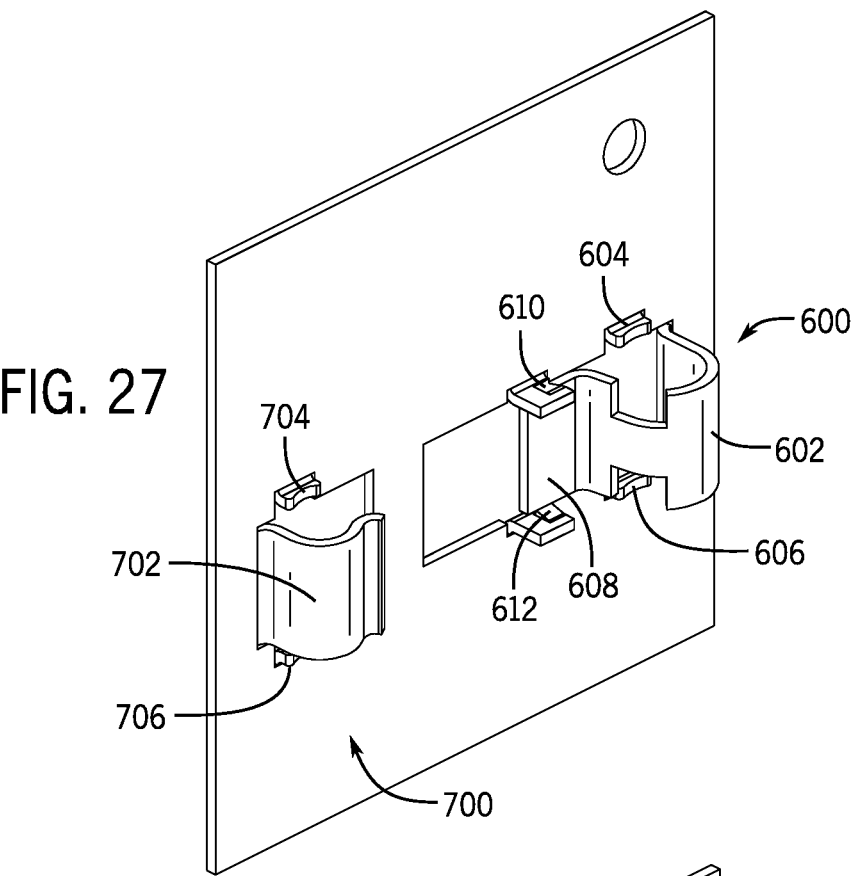
FIG. 27 is a top front isometric view of straps for a hanger according to another embodiment of the invention.

In some embodiments, other features can be provided to help secure a threaded object. For example, FIG. 27 illustrates a set of straps 600, 700 that can be used alone or in conjunction with the hangers 100, 200, or other hangers with partial threads, to engage a threaded object. The strap 600 includes a strap body 602, a set of thread engagement tabs 604, 606 that form partial threaded portions, a locking tab 608 extending from the body 602, and a set of retention clip locks 610, 612 sized to receive and retain the locking tab 608 thereunder. Additionally, or alternatively, the strap body 602 can be formed with a partial thread portion extending inward toward the thread engagement tabs 604, 606.

Figure 28:
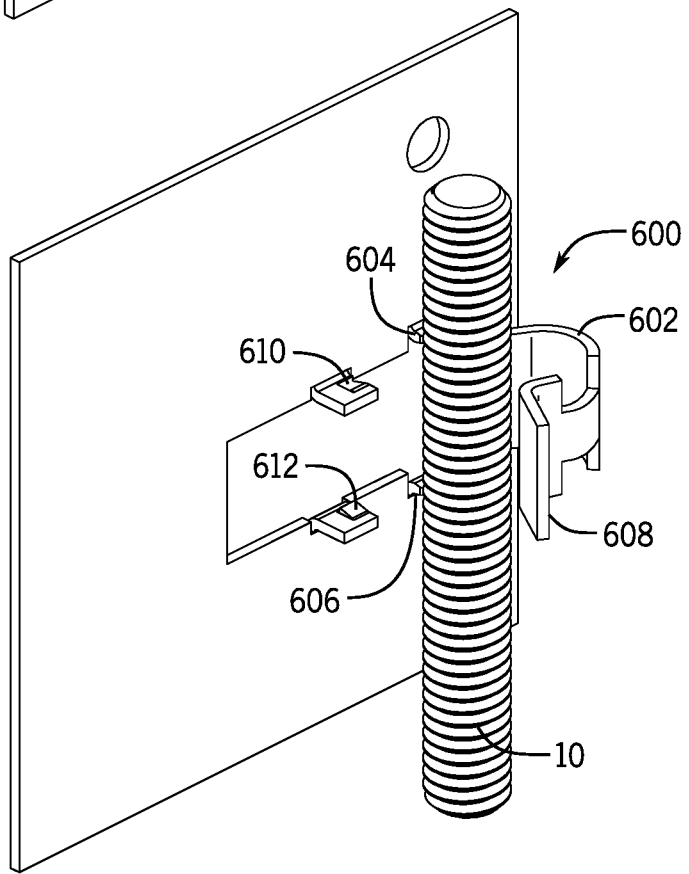
FIGS. 28 and 29 illustrate installation steps for retaining a threaded rod within one of the straps of FIG. 16 according to another embodiment of the invention.
Figure 29:
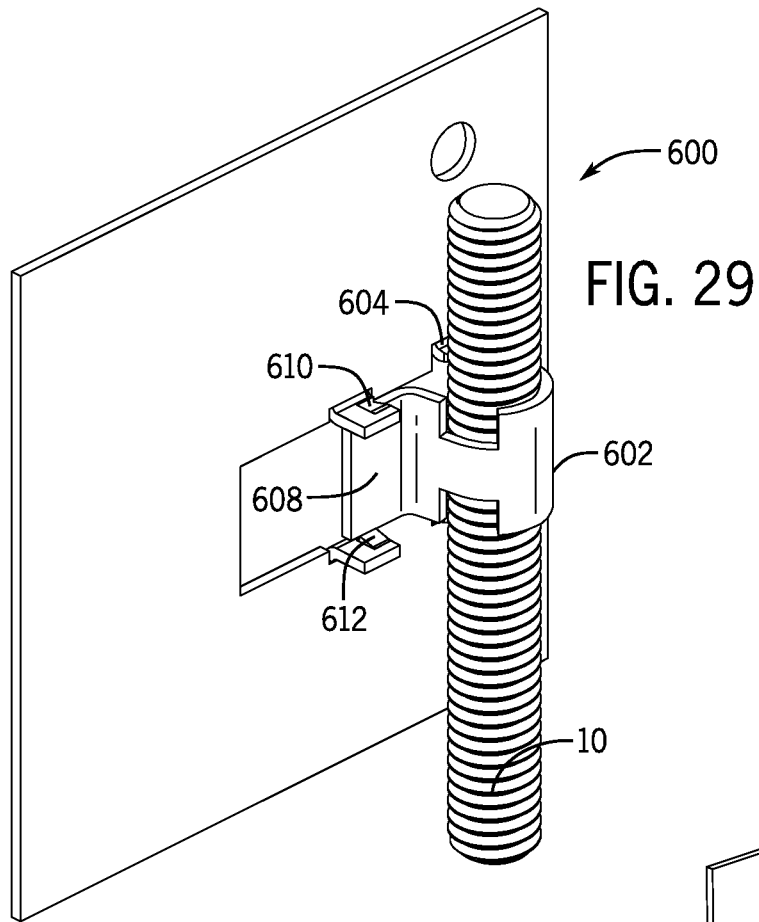

In FIGS. 28 and 29, a threaded object, for example, the threaded rod 10, is shown in the process of being engaged with the strap 600. The threaded rod 10 is received between the strap body 602 and the thread engagement tabs 604, 606 and the strap body 602 is then bent over the threaded rod 10 to secure the threaded rod 10 between the strap body 602 and the thread engagement tabs 604, 606 and engage the threaded rod 10 with the thread engagement tabs 604, 606. The locking tab 608 is then pressed into and between the retention clip locks 610, 612 to retain the locking tab 608 and to further secure the engagement of the strap 600 around the threaded rod 10.

Looking back to FIG. 27, the strap 700 is shown with a strap body 702 and a set of thread engagement tabs 704, 706 that form partial threaded portions on either side of the strap body 702. Additionally, or alternatively, the strap body 702 can be formed with a thread portion extending inward toward the thread engagement tabs 704, 706. In use, a threaded object can be received between the strap body 702 and the thread engagement tabs 704, 706. The strap body 702 is configured to be bent or resiliently move over the threaded object (not shown) to further retain the engagement of the thread engagement tabs 704, 706 with a threaded object (not shown).

Figure 30:
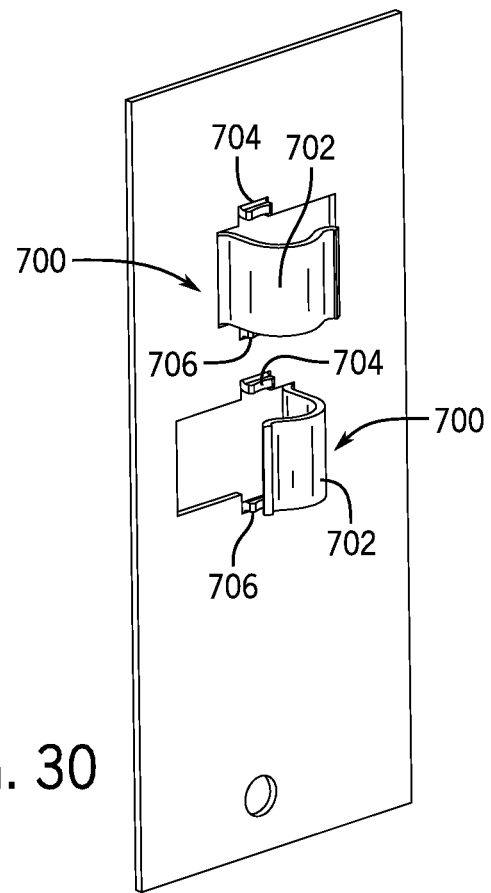
FIG. 30 is top front isometric view of straps that are axially aligned and face in opposing directions according to another embodiment of the invention.

In some embodiments, multiple straps can be used. For example, as shown in FIG. 30, a set of two of the straps 700 are axially aligned with each other, with openings that face in opposing directions. A threaded object (not shown) can be received with each of the straps 700 and the strap bodies 702 can be bent (or resiliently flex) around the threaded object to further engage the threaded object with the thread engagement tabs 704, 706 of each of the straps 700. For example, a hanger with the straps 700 arranged as in FIG. 30 can be pivoted within the plane of a substrate that supports the straps 700 to snap a threaded rod into engagement with both of the straps 700 and all of the partial threaded portions of the tabs 704, 706.

In some instances a strap may be used to secure a threaded object in conjunction with another thread engaging mechanism. For example, in FIG. 31 a strap body 702 is shown axially spaced from an extruded partial thread portion 812 on hanger 800 with a J-Hook support 802. A threaded object (not shown) can be engaged with the threads of the extruded partial portion 812 and further secured to the J-Hook support 802 by the strap body 702.

In other embodiments, other configurations are possible. For example, certain features and combinations of features that are presented with respect to particular embodiments in discussion above, can be utilized in other embodiments and in other combinations, as appropriate. In this regard, for example, different configurations of partial thread portions, hanger bodies, straps, and so on, as presented with respect to a particular one of the hangers 100, 200 or other examples discussed above can be implemented in combination with features of any number of the other hangers 100, 200 or others.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system. For example, some methods have been described with respect to the hangers 100, 200 and the engagement with the threaded rod 10 therein and with respect to the hanger body 502, the clip retainer strap 522, the hinged retainer strap 544, and the engagement with the threaded rods 20, 30, however, other methods are contemplated.

Thus, embodiments of the inventions can provide an improved hanger for engaging a threaded object, such as threaded rods. In some embodiments, hangers according to the invention can substantially reduce the time and labor that may be required during installation and use, such as by obviating the need to thread the hanger onto the threaded rod or otherwise use a nut to secure the hanger thereto. Further, some embodiments of the invention can be releasably engaged with the threaded rod to more easily install and move the hanger, thereby allowing for attachment of the hanger to the threaded rod in hard or difficult areas to reach. Additionally, some embodiments of the invention can be used, without modification, on a variety of threaded object sizes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hanger for retaining a threaded rod with a longitudinal axis, the hanger comprising:
a hanger body with a partial thread portion configured to engage with threads of the threaded rod, the partial thread portion including a first surface with threads arranged to engage the threads of the threaded rod and a second surface that is opposite the first surface and includes ribs that are opposite roots of the threads of the first surface; and
a retainer configured to retain the threaded rod within the partial thread portion when the hanger is in an engaged configuration in which the partial thread portion is engaged with the threads of the threaded rod to carry an axial load on the threaded rod;
wherein the hanger is configured to move from a non-engaged configuration to the engaged configuration without rotation of the hanger body or the threaded rod about the longitudinal axis.

2. The hanger of claim 1, wherein the partial thread portion has a first set of threads sized to engage with threads of a first threaded rod with a first diameter and a second set of threads sized to engage with threads of a second threaded rod with a second diameter, wherein the first diameter is smaller than the second diameter.

3. The hanger of claim 2, wherein the first set of threads of the partial thread portion are nested within the second set of threads.

4. The hanger of claim 2, wherein the first set of threads of the partial thread portion are superimposed on the second set of threads.

5. The hanger of claim 1, wherein the partial thread portion is integrally formed within the hanger body.

6. The hanger of claim 1, wherein retainer is a strap clip movably engaged with the hanger body.

7. The hanger of claim 6, wherein a distal end of the strap clip includes a clip end movably engaged with the hanger body.

8. The hanger of claim 7, wherein the distal end has a catch configured to secure the strap clip to the hanger body with the hanger in the non-engaged configuration.

9. The hanger of claim 8, wherein the hanger further includes a tab extending resiliently to secure the strap clip to the hanger body with the hanger in the engaged configuration.

10. The hanger of claim 9, wherein, with the hanger in the engaged configuration, the tab induces a retention force onto the threaded rod, via the strap clip, to retain thread engagement between the threads of the threaded rod and threads of the partial threaded portion.

11. A hanger for retaining a threaded rod, the hanger comprising:
a hanger body with a partial thread portion integrally formed therein and configured to engage with threads of the threaded rod, the partial thread portion including a set of nested threads that include a first thread overlapping a second thread; and
a retainer coupled to the hanger body and movable between a non-engaged configuration in which the retainer is spaced from the hanger body to permit axial passage of a threaded rod between the retainer and the partial thread portion, and an engaged configuration in which the threaded rod is retained in threaded engagement with the partial thread portion.

12. The hanger of claim 11, wherein the first thread is configured to threadingly engage a first external thread size; and
wherein the second thread is configured to threadingly engage a second external thread size that is larger than the first external thread size.

13. A hanger for retaining a threaded rod, the hanger comprising:
a hanger body with a partial thread portion integrally formed therein and configured to engage with threads of the threaded rod, the partial thread portion being formed with threads having roots on a threaded-rod-engaging side and ribs positioned opposite the roots on a side opposite the threaded-rod-engaging side; and
a retainer coupled to the hanger body and movable between a non-engaged configuration in which the retainer is spaced from the hanger body to permit axial passage of a threaded rod between the retainer and the partial thread portion, and an engaged configuration in which the threaded rod is retained in threaded engagement with the partial thread portion.

14. The hanger of claim 11, wherein the retainer is configured to biasingly urge the threads of threaded rod into engagement with the partial thread portion.

15. The hanger of claim 11, wherein the retainer is a strap clip that is configured to extend over the partial thread portion and engage the hanger body at locations laterally spaced from the partial thread portion.

16. The hanger of claim 15, wherein hanger body has a set of slots and the retainer has a set of clip ends receivable within the set of slots to couple the retainer to the hanger body in the non-engaged configuration.

17. The hanger of claim 16, wherein each clip end of the retainer has a tab engageable with the hanger body to secure the retainer in the engaged configuration.

18. A method for securing a threaded rod with a longitudinal axis on a hanger without rotation of the threaded rod about the longitudinal axis, the method comprising:
orienting a hanger body of the hanger with a retainer of the hanger in a non-engaged configuration;
engaging a thread of the threaded rod with a partial thread portion of the hanger body, the partial thread portion including a set of nested threads that include a first thread overlapping a second thread; and
securing the thread of the threaded rod in engagement with the partial threaded portion by moving the retainer from the non-engaged configuration to an engaged configuration.

* * * * *